US008023999B2

(12) United States Patent
Fischer

(10) Patent No.: US 8,023,999 B2
(45) Date of Patent: Sep. 20, 2011

(54) BASE STATION ARCHITECTURE USING DECENTRALIZED DUPLEXERS

(75) Inventor: Georg Fischer, Nuremberg (DE)

(73) Assignee: Alcatel Lucent, Paris (FR)

( * ) Notice: Subject to any disclaimer, the term of this patent is extended or adjusted under 35 U.S.C. 154(b) by 688 days.

(21) Appl. No.: 11/647,096

(22) Filed: Dec. 28, 2006

(65) Prior Publication Data
US 2008/0161055 A1 Jul. 3, 2008

(51) Int. Cl.
*H04M 1/00* (2006.01)
(52) U.S. Cl. ............... 455/561; 455/556.1; 455/456.5; 455/77; 370/275; 370/276; 370/338
(58) Field of Classification Search ............... 455/561, 455/575.5, 575.7, 90.1, 556.1, 557, 562.1, 455/150.1, 168.1, 188.1, 88, 550, 78, 550.1, 455/59, 136, 403, 101, 77, 82, 76.78, 83, 455/500; 370/328, 277, 219, 275, 276
See application file for complete search history.

(56) References Cited

U.S. PATENT DOCUMENTS

| 4,637,073 | A | * | 1/1987 | Selin et al. | 455/78 |
|---|---|---|---|---|---|
| 4,970,479 | A | * | 11/1990 | Landt et al. | 333/101 |
| 5,084,869 | A | | 1/1992 | Russell | |
| 5,634,191 | A | | 5/1997 | Beasley | |
| 6,411,825 | B1 | * | 6/2002 | Csapo et al. | 455/561 |
| 6,801,788 | B1 | * | 10/2004 | Csapo et al. | 455/561 |
| 6,983,174 | B2 | * | 1/2006 | Hoppenstein et al. | 455/562.1 |
| 2002/0186758 | A1 | * | 12/2002 | Vangala | 375/219 |
| 2003/0017806 | A1 | * | 1/2003 | Sutono et al. | 455/59 |
| 2005/0047384 | A1 | * | 3/2005 | Wax et al. | 370/338 |
| 2005/0085267 | A1 | * | 4/2005 | Lemson et al. | 455/562.1 |
| 2005/0085270 | A1 | * | 4/2005 | Sobczak et al. | 455/562.1 |
| 2005/0118963 | A1 | * | 6/2005 | Chiu | 455/115.1 |
| 2005/0143131 | A1 | * | 6/2005 | Gish et al. | 455/561 |
| 2005/0215288 | A1 | * | 9/2005 | Beaudin et al. | 455/562.1 |
| 2005/0277402 | A1 | * | 12/2005 | Yowakim et al. | 455/403 |
| 2006/0098723 | A1 | * | 5/2006 | Toncich et al. | 375/219 |
| 2007/0072561 | A1 | * | 3/2007 | Weber et al. | 455/101 |
| 2007/0105505 | A1 | * | 5/2007 | Crocker et al. | 455/78 |
| 2007/0252698 | A1 | * | 11/2007 | Turner | 340/572.2 |
| 2008/0007453 | A1 | * | 1/2008 | Vassilakis et al. | 342/368 |
| 2008/0130786 | A1 | * | 6/2008 | Tudosoiu et al. | 375/297 |

(Continued)

FOREIGN PATENT DOCUMENTS

GB 2 347 319 A 8/2000

(Continued)

OTHER PUBLICATIONS

PCT International Search Report corresponding to PCT Patent Application PCT/US2007/025657 filed Dec. 14, 2007 (3 pages).

(Continued)

*Primary Examiner* — Tan Trinh
(74) *Attorney, Agent, or Firm* — Harness, Dickey, Pierce

(57) ABSTRACT

Disclosed is a base station comprising an antenna and a plurality of integrated transceiver modules. Each integrated transceiver module includes a radio and a decentral duplexer connected to the radio and the antenna for transmission of and reception of communication signals. The integrated transceiver module therefore modularizes the base station so that all of the components of a base station can be located on a single module (e.g., one printed circuit board (PCB)). The base station can be upgraded by inserting additional integrated transceiver modules into the base station.

17 Claims, 3 Drawing Sheets

U.S. PATENT DOCUMENTS

| | | | |
|---|---|---|---|
| 2008/0232305 A1* | 9/2008 | Oren et al. | 370/328 |
| 2008/0267097 A1* | 10/2008 | Berglund et al. | 370/277 |
| 2009/0124214 A1* | 5/2009 | Zhang et al. | 455/78 |
| 2009/0258607 A1* | 10/2009 | Beninghaus et al. | 455/77 |

FOREIGN PATENT DOCUMENTS

| | | |
|---|---|---|
| WO | WO 2006/098546 A | 9/2006 |

OTHER PUBLICATIONS

PCT Written Opinion of the International Searching Authority corresponding to PCT Patent Application PCT/US2007/025657 filed Dec. 14, 2007 (6 pages).

\* cited by examiner

BASE STATION ARCHITECTURE USING DECENTRALIZED DUPLEXERS

BACKGROUND OF THE INVENTION

The present invention relates generally to mobile communications, and more specifically to base stations used in mobile communications.

Mobile communications are implemented by means of appropriate network architecture. FIG. 1 shows a high level block diagram of an exemplary mobile network architecture. In FIG. 1, device 102 is a wireless mobile device that can communicate with first base station 104. Usually, a multiplexing technology is used for such access, such as, for example, Code Division Multiple Access (CDMA), Time Division Multiplexing (TDMA), etc. The network includes the first base station 104, a second base station 106, and a third base station 108. Each base station 104, 106, 108 has a transmission range that defines a cell 110, 112, 114. Any given base station transmits and receives mobile calls via the cell's antenna. Thus, a wireless mobile device located within a given cell transmits and receives call information to/from the base station associated with that cell.

Each base station 104, 106, 108 communicates with, and is controlled by, a mobile switching center (MSC) 116. The MSC 116 switches calls between the cellular network and the public switched telephone network (PSTN) and vice versa. For example, consider landline telephone 120 connected to central office (CO) 124. The CO 124 communicates with the MSC 116. When a user of the landline telephone 120 calls mobile device 102, the call is routed to the MSC 116 in a well known manner. A typical MSC is aware of the cell location of all mobile phones and directs the call to the first base station 104 because the mobile device 102 is located in the first cell 110.

FIG. 2 shows a more detailed block diagram of a traditional base station 200. The base station 200 includes a plurality of radios, such as a first radio 204, a second radio 208, and a third radio 212. Each radio 204, 208, 212 generates transmission signals having a particular frequency to be transmitted to a mobile device and also analyzes/processes signals received by the base station from the mobile device. The signal generated by each radio 204, 208, 212 is first sent to a respective power amplifier (PA) 220, 224, 228 for amplification before the signal is transmitted to a mobile device. An output signal (the amplified signal) of each PA 220, 224, 228 is transmitted to an Antenna Interface Frame (AIF) 232.

In more detail, an output signal (e.g., a first output signal 236) is transmitted from a PA (e.g., first PA 220) to a transmit combiner 240 of the AIF 232. The transmit combiner 240 combines the output signals from the PAs 220, 224, 228 into a single output signal 244. The single output signal 244 has a power that is the summation of the powers (i.e., the signal spectra) associated with the output signal of each PA 220, 224, 228. The output signal 244 of the transmit combiner 240 is then provided as input to a central duplexer 248 of the AIF 232.

The central duplexer 248 is a device that isolates a transmit signal path 252 from a receive signal path 256 while permitting them to share a common antenna 260. The duplexer 248 can combine communication signals onto a single cable for transmission by the antenna 260. The duplexer 248 can also filter the signals before sending or receiving signals to/from the common antenna 260. The central duplexer 248 is designed for operation in the frequency band used by the receiver 256 and the transmitter 252, and is capable of handling the output power of the output signal 244 of the transmit combiner 240.

The receive path 256 of the central duplexer 248 passes a receiver signal 264 to a receive splitter 268. The receive splitter 268 splits the receiver signal 264 into a plurality of radio signals (e.g., radio signal 272) that are each associated with a corresponding radio (e.g., radio 212).

The design of a traditional base station, such as base station 200, has several drawbacks. First, base stations (e.g., base station 200) typically have a complex and costly AIF that hosts many components including the central duplexer. When additional radios and PAs are added to a base station, additional transmit combiners and receive splitters often have to be added to the AIF.

Second, the duplexer is a central element whose power capacity is designed to meet the maximum capacity (equal to the maximum number of radio frequency (RF) carriers (e.g., radios)) of a base station. To illustrate, suppose an operator of a mobile network has a need to handle three carriers. The operator purchases a base station that can handle the required three carriers from a seller of base stations. At a later point in time, the operator may determine that the operator needs to add a fourth carrier to the capacity of the base station. The operator then has to upgrade the base station by purchasing an additional radio and an additional PA. The central duplexer, however, is not replaced because the duplexer in the base station has to be able to handle the maximum number of carriers of the base station. Therefore, the AIF (and therefore the base station itself) typically has a high entry cost (i.e., with initial deployments, there are costs associated with the final (i.e., maximum capacity) configuration after capacity upgrades are made) because of the cost associated with the initially deployed central duplexer. Thus, a typical operator pays for a central duplexer that can handle the maximum capacity of the base station when the operator initially purchases the base station. This traditionally results in a high, up-front cost for the operator.

Third, base stations also often have separate printed circuit boards (PCBs) (also referred to as Maintenance Replaceable Units, or MRUs) for the radio, PA, and AIF. Even if one or more of the radio(s) and PA(s) are integrated into a single PCB (i.e., MRU), the AIF is typically located with a separate PCB (i.e., MRU). Therefore, someone who maintains a base station may need to have all of the PCBs (MRUs) associated with the different components of the base station. Further, when an owner of a base station decides to upgrade the base station for more capacity or other enhanced features, the owner typically has to replace multiple MRUs.

Therefore, there remains a need to solve many of the shortcomings associated with traditional base stations.

BRIEF SUMMARY OF THE INVENTION

In accordance with an aspect of the present invention, a base station includes an antenna and a plurality of integrated transceiver modules. Each integrated transceiver module includes a radio and a duplexer that connects to the radio and the antenna for transmission of and reception of communication signals. Accordingly, in one aspect of the invention, there is no centralized duplexer and the function of the duplexer is thereby "decentralized". The integrated transceiver module therefore modularizes the base station so that all of the components of a base station can be located on a single module (e.g., one printed circuit board (PCB) or Maintenance Replaceable Unit (MRU)). The base station can be upgraded by inserting additional integrated transceiver modules into the base station.

In one embodiment, each integrated transceiver module also includes a power amplifier in communication with the radio and the duplexer and configured to amplify communication signals transmitted by the radio to the duplexer.

Each integrated transceiver module may be connected to the antenna via a common star point. In one embodiment, the common star point is a solder joint. Each transceiver module may also include a left handed compensator in communication with the duplexer and configured to compensate for frequency dependency of a cable connecting the duplexer and the star point.

In one embodiment, the radio, power amplifier, duplexer and/or left handed compensator are manufactured using microstrip technology. The duplexer may be configured to transmit and receive communication signals of a frequency channel associated with the radio.

These and other advantages of the invention will be apparent to those of ordinary skill in the art by reference to the following detailed description and the accompanying drawings.

DETAILED DESCRIPTION

In accordance with an aspect of the present invention, the central duplexer is "decentralized" by having a "decentral" duplexer for every RF carrier (e.g., every radio and power amplifier (PA)).

Figure 1:
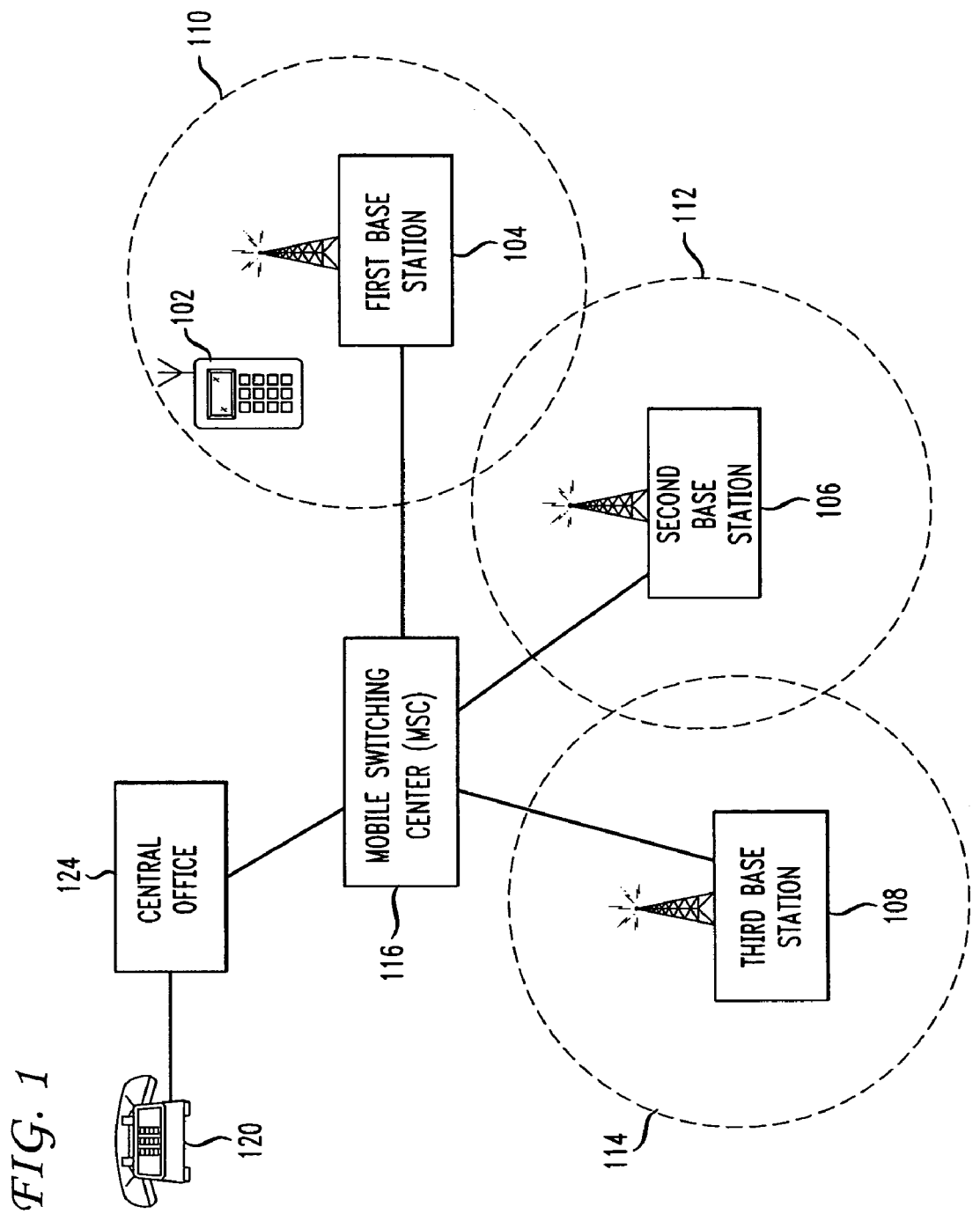
FIG. 1 is a block diagram of an exemplary network including base stations and a mobile switching center.
Figure 2:
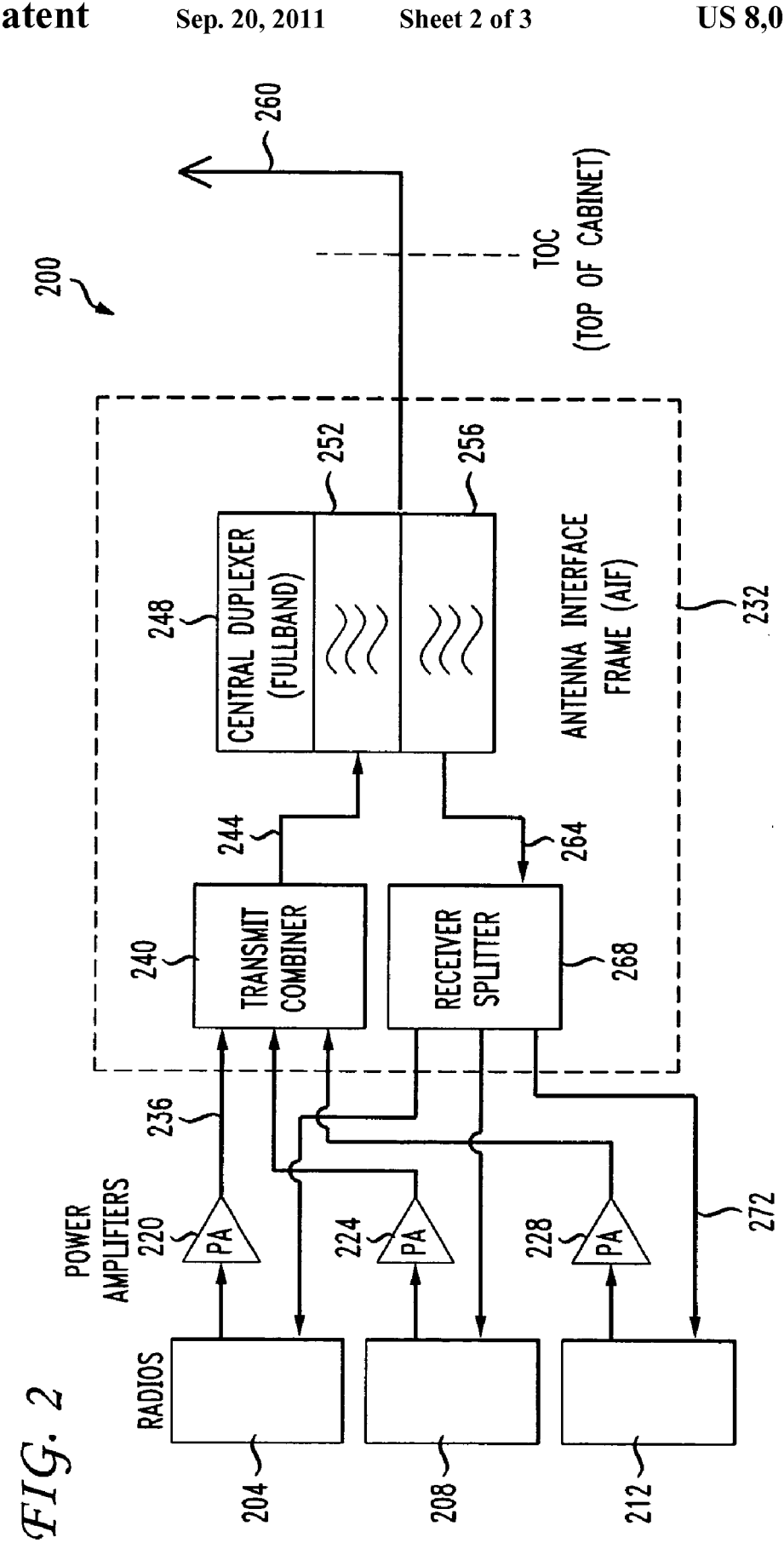
FIG. 2 is a more detailed block diagram of an exemplary base station using a central duplexer.
Figure 3:
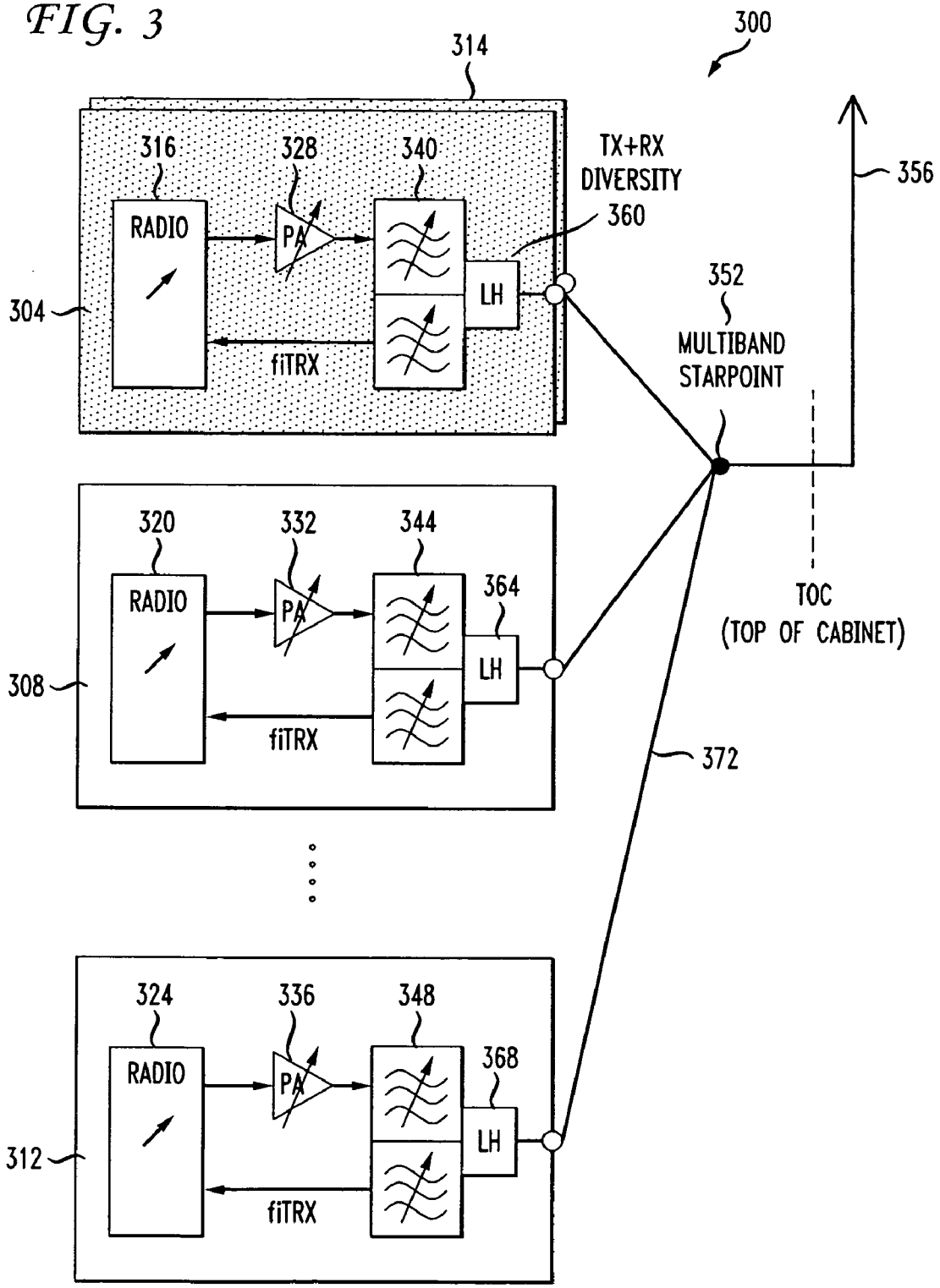
FIG. 3 is a block diagram of a base station RF architecture using decentral duplexers in accordance with an embodiment of the present invention.

FIG. 3 is a block diagram of a base station 300 having four separate modules 304, 308, 312, 314. Each module 304, 308, 312 includes a respective radio 316, 320, 324, a respective PA 328, 332, 336, and a separate, respective decentral duplexer 340, 344, 348. In one embodiment, each PA 328, 332, 336 is a variable PA (e.g., the frequency and/or the power amplification provided by the PA 328, 332, 336 can be varied). Although this configuration requires additional components (i.e., a duplexer for each module 304, 308, 312, 314), the configuration is actually more cost effective than the base station shown in FIG. 2 because it avoids up-front payment for a larger duplexer and a less powerful (e.g., less power handling) duplexer is needed for each module 304, 308, 312, 314. In particular, each duplexer 340, 344, 348 handles the power associated with a single RF carrier instead of the combined power associated with all of the RF carriers (e.g., as shown with output signal 244 of FIG. 2). Thus, the duplexers 340, 344, 348 required for each module 304, 308, 312 have less stringent power handling requirements than the central duplexer 248 of the AIF 232 in the configuration of FIG. 2. Further savings may be realized by using filter structures that are less costly but limited in power handling in one or more of the duplexers 340, 344, 348 to filter the signal(s) transmitted (or received). It should be noted that the description also applies to the fourth module 314 but is not explicitly stated because the components of the module 314 are not shown.

Assume that each carrier 316, 320, 324 transmit path provides 20 W of average power and each has a Crest factor (peak to average power ratio of Modulation) of 7 dB (=factor 5). Each duplexer 340, 344, 348 then has to handle 20 W average power and 100 W peak power (20 W×5). In comparison, the central duplexer 248 shown in FIG. 2 with 4 RF carriers has to handle 80 W average power (4×20 W) and 1600 W peak power (100 W×4 signals×4 peaks in phase) due to constructive superposition of RF signals which may occur. Thus, there is a saving in peak power by a factor of 16 (1600/100) due to the decentralized approach of FIG. 3. A power saving by a factor 16 is equivalent to a voltage handling saving by a factor of 4 (i.e., the square root of 16).

Central duplexers are typically manufactured using cavity resonator technology. A cavity resonator is a hollow chamber whose dimensions allow the resonant oscillation of electromagnetic (or acoustic) waves. To manufacture a cavity resonator, an alumina block is typically milcutted.

In one embodiment, each decentralized duplexer 340, 344, 348, however, is instead manufactured using metamaterial filter technology. Metamaterial structures can be built using microstrip technology. Microstrip technology is typically much cheaper than milcutting an alumina (or other metal) block. Furthermore, microstrip technology is typically also used to manufacture the radio and the power amplifier. Thus, by using the decentral duplexer design, the manufacturing technology for the duplexers 340, 344, 348 becomes compatible with the manufacturing technology of the radio and the power amplifier. Further, as the efficiency of power amplifiers improves (e.g. by using switch-mode power amplifiers), the heat dissipation of power amplifiers may be reduced. As a result, in one embodiment the radio, PA and the decentral duplexer are combined on a common PCB, thereby forming a "single board", fully integrated transceiver (fiTRX) module (shown as module 304, 308, 312). The construction of such a transceiver may be automated via one or more machine placing SMDs (Surface Mount Devices) on a PCB.

In one embodiment, the power saving described above may reduce problems associated with the tuning of metamaterial duplexers (e.g., limited power handling capability). Specifically, tuning elements like varactors and RF switches inside metamaterial structures that are used to tune and reconfigure the structures often have to handle large voltages and larger currents if the duplexer has to handle large power RF signals. Tuning elements are typically limited in terms of current and voltage handling. Handling large currents and voltages with coaxial resonators may come at a cost of large form factors.

The combination of multiple RF carriers in each module 304, 308, 312, 314 is implemented using filter combining technology on the transmit side (TX) and filter splitting technology on the receive side. Filter combining/splitting is implemented when the decentral duplexer passes the active transmit/receive channel (e.g., 5 MHz with the Universal Mobile Telecommunications System (UMTS) network) rather than the full band (e.g. 60 MHz in the IMT2000 band). Thus, unlike the central duplexer 248 of FIG. 2, which receives the entire frequency band that is going to be transmitted (via combined output signal 244 associated with radios 204, 208, 212) and that is received (via the antenna 260), each decentral duplexer only transmits and receives the active transmit/receive frequency channel associated with its radio and not the entire frequency band (e.g., associated with radios 316, 320, 324). Furthermore, there is no longer a need for a transmit combiner or a receive splitter (or an AIF) when using decentral duplexers.

In one embodiment, filter combining and/or filter splitting (by each decentral duplexer) is achieved because the metamaterial filter structures have an impedance near infinity if the filter operates outside its passband.

The decentral duplexers 340, 344, 348 of the base station 300 connect to a common star point 352. The star point 352 connects with an antenna 356.

In one embodiment, each decentral duplexer 340, 344, 348 can be tuned over a wide frequency range (e.g. more than an octave). This may result in the base station 300 being a multi-band base station. In another embodiment, the decentral duplexers 340, 344, 348 are each tuned to different frequencies and still connect to star point 352.

In one embodiment, a coaxial cable connects the decentral duplexers residing inside the fiTRX with the star point 352. An impedance of infinity (before the coaxial cable connects the decentral duplexer to the antenna) may be transformed into non-infinity impedance (when the coaxial cable is connected) (by line transformation effects), which then violates the concept of the common star point. Specifically, at the star point 352, at one channel one coax cable provides nominal impedance (e.g., 50 Ohms) and other cables then provide infinity. This is needed to have one 50 Ohm path for each channel. As power has to flow only one way, if other cables also provided 50 Ohms, the power from one transmitter can get backwards into another transmitter at one channel. Thus, power from one transmitter goes completely into the antenna and not backwards into the other transceivers. It is therefore beneficial to compensate the regular "right handed" behavior of classical coax cables with a "left handed" (LH) compensator. In particular, each duplexer 340, 344, 348 is in communication with a respective LH compensator 360, 364, 368. The LH compensator 360, 364, 368 compensates for the frequency dependency of the cable (e.g., cable 372) from the decentral duplexer (e.g., duplexer 348) to the star point 352.

The LH compensator may only affect the phase of an RF signal and not its amplitude. The combination of a right handed coax cable and a left handed compensator results in transparency for multiple frequency bands. This combination can maintain an out of band impedance of infinity between the decentral duplexer 340, 344, 348 and the star point 352. As the compensation by the LH compensator works multiple bands, fiTRXs at different frequency bands can be connected to the common star point 352, allowing for the creation of a multi-band base station 300. The LH compensator may have applications with a multicarrier base station router (BSR).

In one embodiment, the LH compensator 360, 364, 368 is located next to the corresponding decentral duplexer 340, 344, 348 inside the fiTRX and is manufactured using the same technology as is used for the decentral duplexer. In one embodiment, the star point 352 is a common solder joint connected to multiple RF cables. In another embodiment, the fiTRX 304, 308, 312 may be connected directly with the antenna 356.

Another advantage of the invention involves easier maintenance. For example, when an individual (e.g., a technician or engineer) has to perform maintenance on the traditional base station (e.g., the base station 200 shown in FIG. 2), the individual has to travel with several maintenance replaceable units (MRUs), such as a replacement AIF, replacement PAs, and replacement radio cards. Even if the radio cards and the PAs are integrated in a single PCB, the individual still has to travel with a PCB of the radio cards and the PAs as well as one or more AIFs. With base station 300, however, the number of MRUs that an individual has to travel with to repair or upgrade the base station 300 may be reduced relative to base station 200 (which typically translates into a cost savings). In particular, if each radio, PA, and duplexer are integrated onto a single PCB, then the PCB may be the only MRU needed.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A base station comprising:
an antenna; and
a plurality of integrated transceiver modules, each integrated transceiver module comprising;
a radio; and
a duplexer connected to said radio and said antenna for transmission of and reception of communication signals, wherein each of the plurality of integrated transceiver modules is connected to said antenna, and each duplexer in said plurality of integrated transceiver modules is configured to transmit and receive different frequency channels of a frequency band relative to other duplexers connected to said antenna, and the different frequency channels are different portions of the frequency band.

2. The base station of claim 1 wherein each integrated transceiver module further comprises a power amplifier in communication with said radio and said duplexer, said power amplifier configured to amplify a communication signal transmitted by said radio to said duplexer.

3. The base station of claim 2 wherein said power amplifier is a variable frequency power amplifier.

4. The base station of claim 1 wherein each integrated transceiver module is connected to said antenna via a common star point.

5. The base station of claim 4 wherein each integrated transceiver module further comprises a left handed compensator in communication with said duplexer and configured to compensate for the frequency dependency of a cable connecting said duplexer and said star point.

6. The base station of claim 1 wherein said radio and said duplexer are manufactured using microstrip technology.

7. The base station of claim 1 wherein each integrated transceiver module is a maintenance replaceable unit.

8. The base station of claim 1 wherein said radio is tunable.

9. A network comprising:
a base station configured to transmit and receive communication signals by an antenna; and
a plurality of integrated transceiver modules, each integrated transceiver module configured to,
generate said communication signals,
analyze said communication signals, and
combine said communication signals onto a single cable for transmission by said base station, and each of said plurality of integrated transceiver modules is configured to transmit and receive different frequency channels of a frequency band relative to other integrated transceiver modules connected to the antenna, and the different frequency channels are different portions of the frequency band.

10. The base station of claim 9, wherein each integrated transceiver module is further configured to amplify said communication signals generated by said integrated transceiver module.

11. The base station of claim 10, wherein said integrated transceiver modules are further configured to vary the frequency of said amplified communication signals.

12. The base station of claim 9, wherein said integrated transceiver modules are manufactured using microstrip technology.

13. The base station of claim 9, wherein said integrated transceiver modules are further configured to tune said communication signals to a frequency.

14. A base station comprising:
 an antenna; and
 a plurality of duplexers, each duplexer in communication with said antenna for transmission of and reception of communication signals, and each duplexer is configured to transmit and receive different frequency channels of a frequency band relative to other duplexersin communication with said antenna, and the different frequency channels are different portions of the frequency band.

15. The base station of claim 14, further comprising:
 a plurality of radios, each of said plurality of radios associated with a separate duplexer in said plurality of duplexers.

16. The base station of claim 15 wherein each duplexer in said plurality of duplexers and its associated radio are part of an integrated transceiver module.

17. The base station of claim 16 wherein each integrated transceiver module further comprises a power amplifier in communication with said each duplexer and said associated radio.

* * * * *